(12) United States Patent
Fujita et al.

(10) Patent No.: US 7,885,741 B2
(45) Date of Patent: Feb. 8, 2011

(54) STEERING CONTROL DEVICE FOR VEHICLES RESTRICTING TARGET STEERING ANGLE

(75) Inventors: Yoshitaka Fujita, Susono (JP); Yoshiaki Tsuchiya, Nishikamo-gun (JP); Takahiro Kojo, Gotenba (JP); Masato Suzumura, Susono (JP); Kenji Asano, Toyota (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 911 days.

(21) Appl. No.: 11/665,330

(22) PCT Filed: Oct. 18, 2005

(86) PCT No.: PCT/JP2005/019455
§ 371 (c)(1),
(2), (4) Date: Apr. 13, 2007

(87) PCT Pub. No.: WO2006/043689
PCT Pub. Date: Apr. 27, 2006

(65) Prior Publication Data
US 2007/0299583 A1    Dec. 27, 2007

(30) Foreign Application Priority Data

Oct. 21, 2004  (JP)  .............................. 2004-306458
Oct. 21, 2004  (JP)  .............................. 2004-306459

(51) Int. Cl.
*B62D 6/00*    (2006.01)
*B62D 5/04*    (2006.01)

(52) U.S. Cl. ........................................ 701/41; 180/443
(58) Field of Classification Search ................... None
See application file for complete search history.

(56) References Cited

U.S. PATENT DOCUMENTS

| 6,041,887 | A | * | 3/2000 | Kojo et al. | ................... 180/446 |
| 6,073,067 | A | * | 6/2000 | Fujiwara et al. | ............... 701/41 |
| 2002/0016657 | A1 | | 2/2002 | Iwazaki | |
| 2002/0036477 | A1 | | 3/2002 | Baumgarten | |
| 2002/0092700 | A1 | | 7/2002 | Kim et al. | |
| 2004/0061465 | A1 | * | 4/2004 | Matsuoka | .................... 318/432 |
| 2004/0104066 | A1 | * | 6/2004 | Sakai | ......................... 180/402 |

FOREIGN PATENT DOCUMENTS

| DE | 102 21 721 A1 | 11/2003 |
| EP | 1 188 640 A2 | 3/2002 |

(Continued)

*Primary Examiner*—Michael J. Zanelli
(74) *Attorney, Agent, or Firm*—Oliff & Berridge, PLC

(57) ABSTRACT

In a vehicle equipped with a power steering device for assisting the steering of the steered wheels by the steering wheel, when the steering angle of the steered wheels reaches the maximum steering angle, a steering control device restricts a target steering angle for operating the power steering device so that the steering angle or a reaction force acting against the power steering device does not exceed a value determined therefor, so to maintain the steering condition of the steered wheels stably without applying an excessive load on the power steering device. The target steering angle may be calculated as a value based upon rotational angle of the steering wheel and turning behavior control of the vehicle.

8 Claims, 5 Drawing Sheets

FOREIGN PATENT DOCUMENTS

| | | |
|---|---|---|
| EP | 1 380 489 A1 | 1/2004 |
| JP | A 6-122373 | 5/1994 |
| JP | A 6-270829 | 9/1994 |
| JP | 10-236328 * | 9/1998 |
| JP | A 11-157461 | 6/1999 |
| KR | A-2002-0040219 | 5/2002 |

* cited by examiner

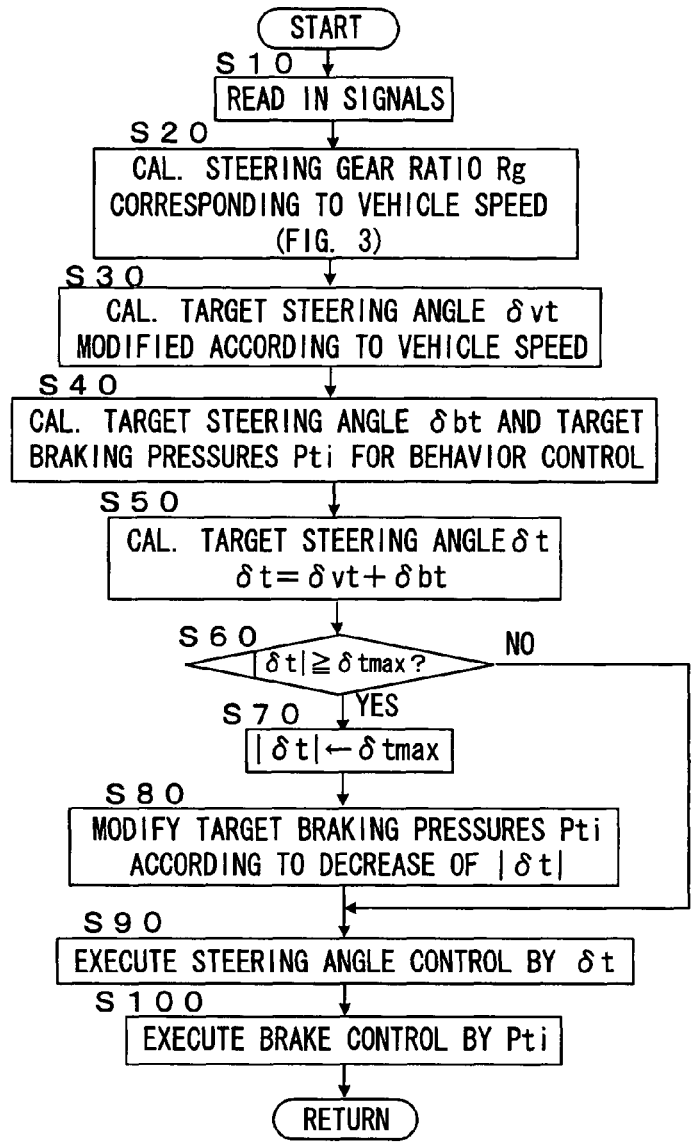
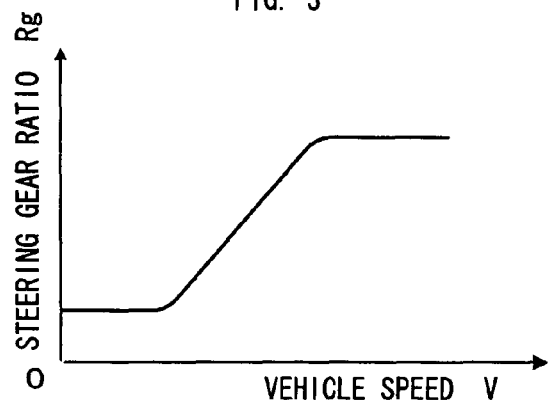

STEERING CONTROL DEVICE FOR VEHICLES RESTRICTING TARGET STEERING ANGLE

FIELD OF THE INVENTION

The present invention relates to a steering control device for vehicles each equipped with a steering wheel, a pair of steered wheels and a power steering device for assisting the steering operation of the steered wheels.

BACKGROUND OF THE INVENTION

It is already known in the art of vehicles such as automobiles to calculate a target steering angle of steered wheels of the vehicle by an electronic control device based upon the running state of the vehicle and to steer the steered wheels by a steer driving device so that the steering angle of the steered wheels becomes the target steering angle.

On the other hand, as one of the steering control devices for vehicles, it is proposed in Japanese Patent Laid-open Publication Hei 11-157461 filed by the same applicant as the present application to provide a mechanism for variably changing the transmission ratio in the steering of the steered wheels by the force of a driving source in a manner of decreasing the transmission ratio when the steering angle of the steered wheels approaches the maximum steering angle for the purpose of protecting the steer driving device. By such a steering control device it is avoided that an excessive load is imposed on the steering mechanism by the steer driving device being actuated when the steered wheels are steered to the maximum steering angle.

DISCLOSURE OF THE INVENTION

Conventionally, in the control of steering the steered wheels to a target steering angle by calculating the target steering angle of the steered wheels based upon the running state of the vehicle and driving the steered wheels by a steer driving device, the target steering angle has been calculated mostly from the viewpoint of how properly the spinning by an oversteering or a drifting out by an understeering is controlled.

On the other hand, even when the transmission ratio in the steer driving by a drive source is decreased when the steering angle of the steered wheels approaches the maximum steering angle in the vehicle equipped with a power steering device, the degree of decrease of the driving force changes according to the displacement of the driving, and moreover, when the driving force is not stabilized, the steering condition of the steered wheels is not stabilized.

In view of the abovementioned situations, it is the principal object of the present invention to provide a steering control device which stably maintains the steering condition by the steering force without imposing an excessive load on the power steering device when the steering angle of the steered wheels reaches the maximum steering angle.

In order to accomplish the abovementioned principal object, the present invention proposes a steering control device of a vehicle equipped with a steering wheel, a pair of steered wheels and a power steering device for assisting steering of the steered wheels, wherein a target steering angle for operating the power steering device is restricted not to exceed a determined value.

When the target steering angle for operating the power steering device is restricted not to exceed a determined value as described above, it is avoided that a more steering force is generated to impose an excessive load on the steering mechanism when the steering angle of the steered wheels reaches a determined maximum steering angle, with the steered wheels being stably maintained at the position of the maximum steering angle until the steering is reversed by the target steering angle being decreased below the determined value.

The target steering angle may be calculated as a value not to exceed the determined value based upon rotational angle of the steering wheel and turning behavior control of the vehicle. By such an arrangement, the steering control device can set the maximum value of the target steering angle simultaneously in calculating the target steering angle according to the steering operation by the driver and the turning behavior control.

The target steering angle may be made not to exceed the determined value by an excessive portion thereof being canceled when steering angle calculated based upon rotational angle of the steering wheel and turning behavior control exceeds the determined value. By such an arrangement, since the calculation of the steering angle based upon rotational angle of the steering wheel and turning behavior control of the vehicle is made cyclically at a period of 10-100 milliseconds by the microcomputer according to the current technique in this art, the excessive portion of the calculated steering angle is easily canceled by binding the value calculated at each cycle at the determined value starting at the time when the calculated value exceeds the determined value.

Or, the target steering angle may be made not to exceed the determined value by a speed of increase thereof being gradually decreased when steering angle calculated based upon rotational angle of the steering wheel and turning behavior control approaches the determined value. By such an arrangement, the target steering angle is converged to the determined value in the manner of soft landing.

Alternatively, however, the target steering angle may be made not to exceed the determined value by a speed of increase thereof being made zero when steering angle calculated based upon rotational angle of the steering wheel and turning behavior control reaches the determined value. In this case, although the soft landing convergence to the determined value of the target steering angle is not available, the excessive portion exceeding the determined value is cancelled as well from the calculated value.

Or, in order to accomplish the abovementioned principal object, the present invention proposes a steering control device of a vehicle equipped with a steering wheel, a pair of steered wheels and a power steering device for assisting steering of the steered wheels, wherein a target steering angle for operating the power steering device is restricted such that a reaction force against operation of the power steering device does not exceed a determined value.

When a target steering angle for operating the power steering device is restricted such that a reaction force against operation of the power steering device does not exceed a determined value as described above, it is also avoided that a more steering force is generated to impose an excessive load on the steering mechanism when the steering angle of the steered wheels reaches a determined maximum steering angle, with the steered wheels being stably maintained at the position of the maximum steering angle until the steering is reversed by the target steering angle being decreased below the determined value.

In this case, also, the reaction force against operation of the power steering device may be made not to exceed the determined value by speed of increase of steering angle calculated based upon rotational angle of the steering wheel and turning behavior control being gradually decreased when the reaction force approaches the determined value. By such an arrangement, since the reaction force against operation of the power steering device gradually increases as the steering angle of the steered wheels approaches the maximum steering angle, the target steering angle is repetitively restricted by a cyclical control thereof, with the reaction force converging to the determined value in the manner of soft landing when the reaction force increases toward the determined value.

In this case, also, the reaction force against operation of the power steering device may be made not to exceed the determined value by speed of increase of steering angle calculated based upon rotational angle of the steering wheel and turning behavior control being made zero when the reaction force reaches the determined value. In this case, although the soft landing convergence to the determined value of the reaction force is not available, the reaction force does never exceed the determined In any of the abovementioned cases, the determined value may be changed according to whether turning behavior control of the vehicle is executed or not. By such an arrangement, the steering control device according to the present invention is more properly adapted to various turning behavior controls rich in the variety of manner of control over a wide range.

BRIEF DESCRIPTION OF THE DRAWINGS

In the accompanying drawings,

FIG. 2 is a flowchart showing a manner of operation of the steering control device according to the present invention;

FIG. 3 is a map showing an example of the steering gear ratio Rg against vehicle speed V;

BEST MODE EMBODIMENTS OF THE INVENTION

In the following, the present invention will be described in the form of some preferred embodiments thereof by referring to the accompanying drawings.

Figure 1:
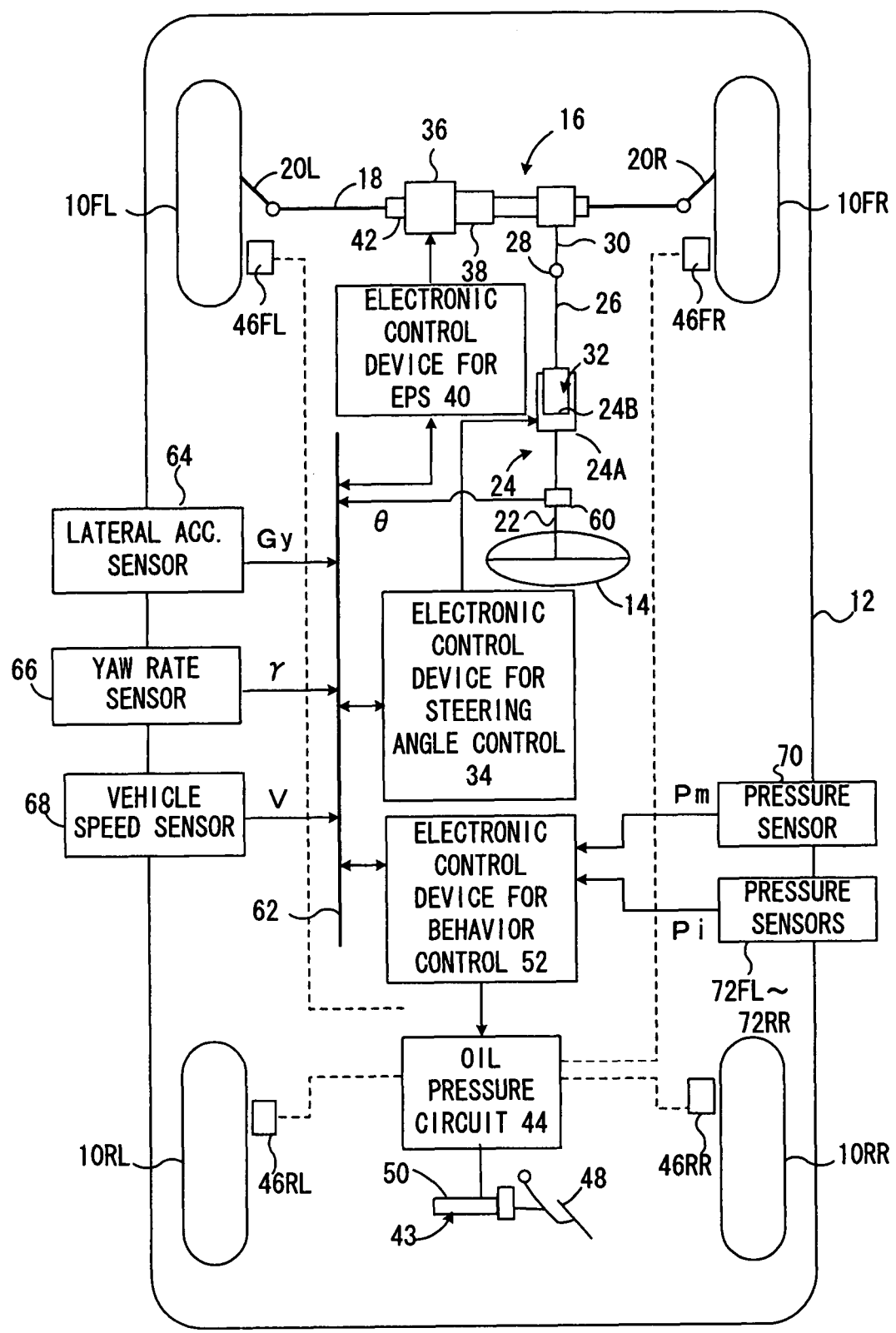
FIG. 1 is a diagrammatical illustration of a vehicle showing the constructional components concerned with the steering control device according to the present invention.

FIG. 1 is a diagrammatical view showing the construction concerned with the present invention of a vehicle equipped with a behavior control device for controlling the behavior of the vehicle by the control of the braking forces of the respective wheels and the control of the steering angle of the steered wheels.

In FIG. 1, 10FL and 10FR are front left and right wheels, respectively, which are steered, and 10RL and 10RR are rear left and right wheels, respectively, which are adapted to be driven by a power source not shown in the figure. These wheels are suspended to the vehicle body 12 by the wheel suspension devices not shown in the figure. The front left wheel 10FL and the front right wheel 10FR are steered by a rack-and-pinion type power steering device 16 in accordance with the steering operation of the steering wheel 14 by the driver by way of a rack bar 18 and tie rods 20L and 20R.

The steering wheel 14 is connected with a pinion shaft 30 of the power steering device 16 by way of an upper steering shaft 22, a steering angle adjusting device 24, a lower steering shaft 26 and a universal joint 28. The steering angle adjusting device 24 is connected with the lower end of the upper steering shaft 22 at the side of the housing 24A and includes an electric motor 32 for modifying steering connected to the upper end of the lower steering shaft 26 at the side of the rotor 24B. The steering angle adjusting device 24 variably adjusts the ratio of the steering angle of the steered front left and right wheels 10FL and 10FR relative to the rotational angle of the steering wheel 14 by rotating the lower steering shaft 26 relative to the upper steering shaft 22, i.e. the steering gear ratio, and also steers the steered front left and right wheels 10FL and 10FR relative to the steering wheel 14 for the purpose of behavior control.

The steering angle adjusting device 24 is controlled by an electronic control device 34 including a microcomputer.

In this connection, when such a trouble has occurred in the steering angle adjusting device 24 that the lower steering shaft 26 can not be rotated relative to the upper steering shaft 22, a locking means not shown in the figure operates to mechanically prevent the relative rotation between the housing 24A and the rotor 24B so that the upper steering shaft 22 and the lower steering shaft 26 are bound together not to rotate relative to one another.

The power steering device 16 is a rack co-axial type electric power steering device (EPS) having an electric motor 36, and a ball-screw type motion conversion mechanism 38 for converting the rotation of the motor 36 to a correspondingly reciprocating movement of the rack bar 18. The electric power steering device 16 is controlled by an electronic control device 40 for controlling the electric power steering device, so as to function as a steering assist force generating device to lessen the steering load of the driver by generating a steering assist force to drive the rack bar 18 relative to the housing 42. In this connection, the construction of the steering assist force generating device itself is known in this art.

The braking forces of the respective wheels are controlled by the pressures Pi (i=fl, fr, rl and rr) in the wheel cylinders 46FL, 46FR, 46RL and 46RR, as controlled by an oil pressure circuit 44. Although not shown in the figure, the oil pressure circuit 44 includes an oil reservoir, an oil pump, various valves and others, and the braking pressures of the respective wheel cylinders are normally controlled according to the depressing operation of the brake pedal 48 by the driver and also individually controlled by an electronic control device 52 for the behavior control as described in detail hereinbelow.

In the shown embodiment, a steering angle sensor 60 is provided at the upper steering shaft 22 for detecting the rotational angle thereof as a steering angle θ, and the signal indicating the steering angle θ is supplied to the electronic control device 34 for the steering control and the electronic control device 52 for the behavior control.

The electronic control device 34 for the steering control and the electronic control device 52 for the behavior control are supplied with a signal indicating lateral acceleration Gy of the vehicle detected by a lateral acceleration sensor 64, a signal indicating yaw rate γ detected by a yaw rate sensor 66, and a signal indicating vehicle speed V detected by a vehicle speed sensor 68 by way of a vehicle information infrastructure 62, and further the electronic control device 52 for the behavior control is supplied with a signal indicating the master cylinder pressure Pm detected by a pressure sensor 70 and signals indicating braking pressures Pi of the respective wheels detected by pressure sensors 72FL-72RR.

The electronic control device 34 for the steering control, the electronic control device 40 for the EPS control and the electronic control device 52 for the behavior control may respectively have microcomputers each including CPU, ROM, RAM and input/output port means interconnected by a common bus. The steering angle sensor 60, the lateral acceleration sensor 64 and the yaw rate sensor 66 detect the steering angle $\theta$, the lateral acceleration Gy and the yaw rate $\gamma$ as positive values when the vehicle is steered or turning leftward and as negative values when the vehicle is steered or turning rightward.

The electronic control device 52 for the behavior control calculates a spin state amount SS showing a spinning tendency of the vehicle and a driftout state amount DS showing a drifting out tendency of the vehicle based upon the vehicle state amounts which change according to the running of the vehicle like the steering angle $\theta$ and the lateral acceleration Gy, and calculates a target yaw moment Mt and a target deceleration Gxbt of the vehicle for stabilizing the behavior of the vehicle.

Moreover, the electronic control device 52 for the behavior control shares the target yaw moment Mt into a target yaw moment Mts by the steering angle control and a target yaw moment Mtb by the braking force control of the respective wheels, calculates a target steering angle $\delta$t for the front left and right wheels (target value of the steering angle for adjusting the steering angle of the steered wheels relative to the steering angle of the steering wheel for the behavior control), and outputs a signal indicating the target steering angle $\delta$t to the electronic control device 34 for the steering angle control by way of the vehicle information infrastructure 62. Moreover, the electronic control device 52 for the behavior control calculates target braking pressures Pti for the respective wheels based upon the target deceleration Gxbt and the target yaw moment, Mtb, and controls the oil pressure circuit 44 so that the braking pressures Pi of the respective wheels become the target braking pressures Pti.

The electronic control device 40 for the EPS control controls the operation of the power steering device 16 based upon the target steering angle $\delta$t input by way of the vehicle information infrastructure 62 so that the steering angle of the steered wheels 10FL and 10FR becomes the target steering angle $\delta$t.

In this regard, it is to be noted that the abovementioned control of the steering angle of the steered wheels and the behavior control by the control of the braking forces themselves do not form the gist of the present invention, and may be executed in any manner known in this art.

Next, the steering control of the vehicle executed by the steering control device according to the present invention is described by referring to the flowchart shown in FIG. 2. The control according to the flowchart shown in FIG. 2 may be started at the closing of an ignition switch not shown in the figure and executed repetitively at a cycle time of 10-100 milliseconds.

When the control is started, in step 10 the signals indicating the steering angle $\theta$ and others are read in, then in step 20 the steering gear ratio Rg is calculated to correspond to vehicle speed V by referring to a map such as shown in FIG. 3, and then in step 30 the steering angle $\theta$ of the steering wheel is divided by Rg to obtain $\delta$vt=$\theta$/Rg, so that the target steering angle $\delta$vt which converts the steering amount of the driver into the steering angle of the steered wheels by taking the vehicle speed into consideration is calculated. This is to decrease the steering angle of the steered wheels relative to the rotational angle of the steering wheel according to an increase of the vehicle speed.

Then in step 40 the spin state amount SS showing the tendency of the vehicle to spin and the driftout state amount DS showing the tendency of the vehicle to driftout are calculated by the electronic control device 52 for the behavior control in the manner known in this art, then based thereupon the target yaw moment Mt and the target deceleration Gxbt for stabilizing the turning behavior of the vehicle are calculated in a manner known in this art, and then based thereupon the target steering angle $\delta$bt and the target braking pressures Pti of the respective wheels for the behavior control are calculated, provided that this target steering angle is not always final to be the target steering angle for operating the power steering device but a provisional value thereof.

Then the control proceeds to step 50, and the target steering angle $\delta$t is calculated by adding $\delta$vt and $\delta$bt calculated in the above.

Then the control proceeds to step 60, and it is judged if the absolute value |$\delta$t| of $\delta$t is equal to or larger than $\delta$tmax, which is the maximum value of the target steering angle $\delta$t to set the steering angle of the steered wheels to an allowable maximum value. The reason why the target steering angle $\delta$t is compared with $\delta$tmax in its absolute value |$\delta$t| is in that the steering angle is made a positive value when the vehicle is making a left turn and a negative value when the vehicle is making a right turn. When the answer is yes, the control proceeds to step 70 and the value of |$\delta$t| is made $\delta$tmax. This is to cancel an excessive portion of the increase of the target steering angle beyond $\delta$tmax by restricting the value of the target steering angle calculated in each cycle of the cyclical control of the steering angle by a cycle time of 10-100 milliseconds through this flowchart within $\delta$tmax.

Since in this case the target steering angle $\delta$bt calculated in step 40 is decreased, in the next step 80 the target braking pressures Pti are modified to correspond to the decrease of |$\delta$t|, in order to maintain the same behavior control condition as much as possible.

When the answer of step 60 is no, steps 70 and 80 are bypassed.

In step 90 the steering control is executed based upon the target steering angle $\delta$t calculated or modified in the above, and then in step 100 the braking control is executed based upon the target braking pressures Pti.

Figure 4:
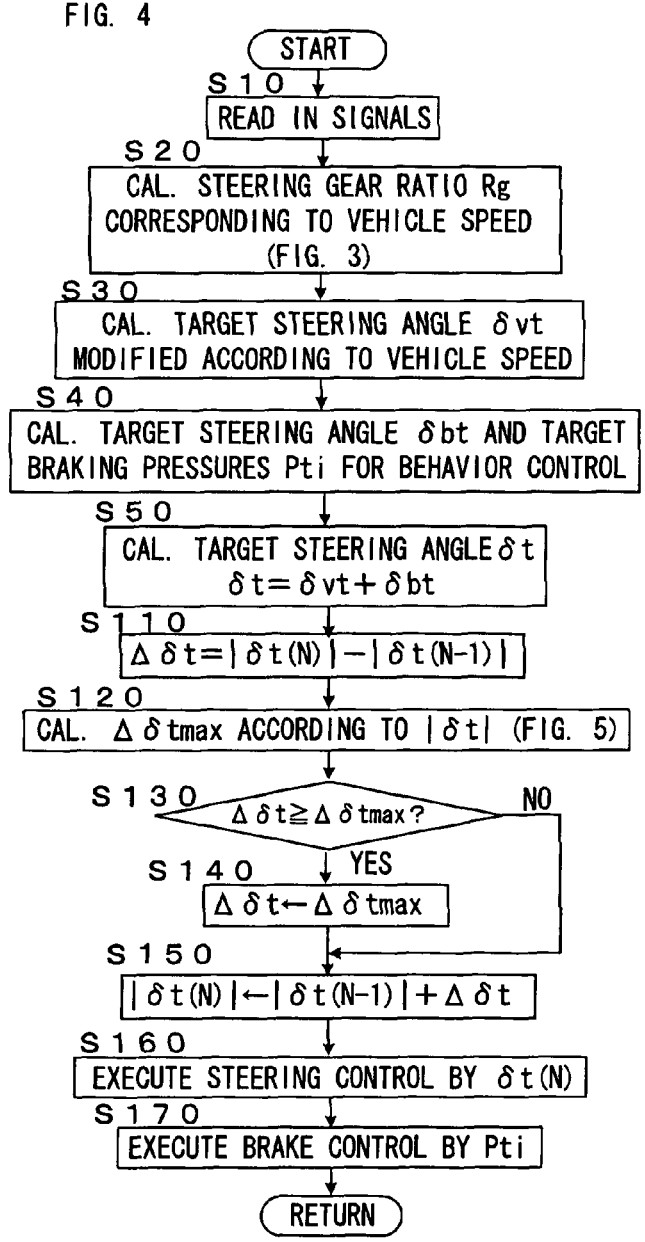
FIG. 4 is a flowchart showing another manner of operation of the steering control device according to the present invention.

FIG. 4 is a flowchart showing another manner of operation of the steering control device according to the present invention. In this manner of operation, the operations of steps 10-50 are the same as those in the flowchart of FIG. 2.

In this embodiment, in step 110 following step 50, the difference $\Delta\delta$t between the target steering angle $\delta$t(N) calculated in the present cycle of control and the target steering angle $\delta$t(N−1) calculated in the previous cycle of control through this flowchart is calculated. This value is an increment per one cycle of the cyclical control through this flowchart, expressing the speed of increase of the target steering angle $\delta$t.

Figure 5:
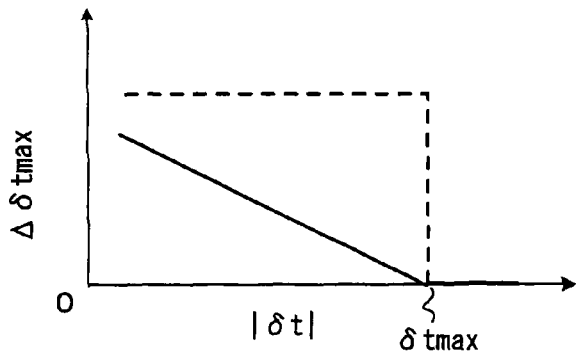
FIG. 5 is a map showing two examples of Δδtmax against |δt|.

Then in step 120 a value such as $\Delta\delta$tmax is calculated to correspond to the value of |$\delta$t| by referring to a map such as shown in FIG. 5. According to the solid line of the map of FIG. 5, the value of $\Delta\delta$tmax decreases gradually as the value of |$\delta$t| approaches the maximum value $\delta$tmax of the target steering angle allowed for setting the steering angle of the steered wheels, becoming 0 when |$\delta$t| reaches $\delta$tmax.

Then the control proceeds to step 130 and it is judged if $\Delta\delta$t calculated in the above step 110 is equal to or larger than $\Delta\delta$tmax or not. When the answer is yes, the control proceeds to step 140, and the value of Δδt is made Δδtmax. This is to decelerate the speed of increase of δt expressed by each increment of δt per each cycle period of the order of 10-100 milliseconds through this flowchart toward 0 as |δt| approaches δtmax, so that the target steering angle is converged toward δtmax in the manner of soft landing not to exceed the maximum value δtmax.

In this connection, when Δδtmax is changed as shown by the broken line of the map of FIG. 5, the increase of |δt| is totally decreased to 0 when |δt| reaches δtmax. Therefore, the change of the target steering amount δt when it approaches its allowable maximum value is the same as in FIG. 2.

Figure 6:
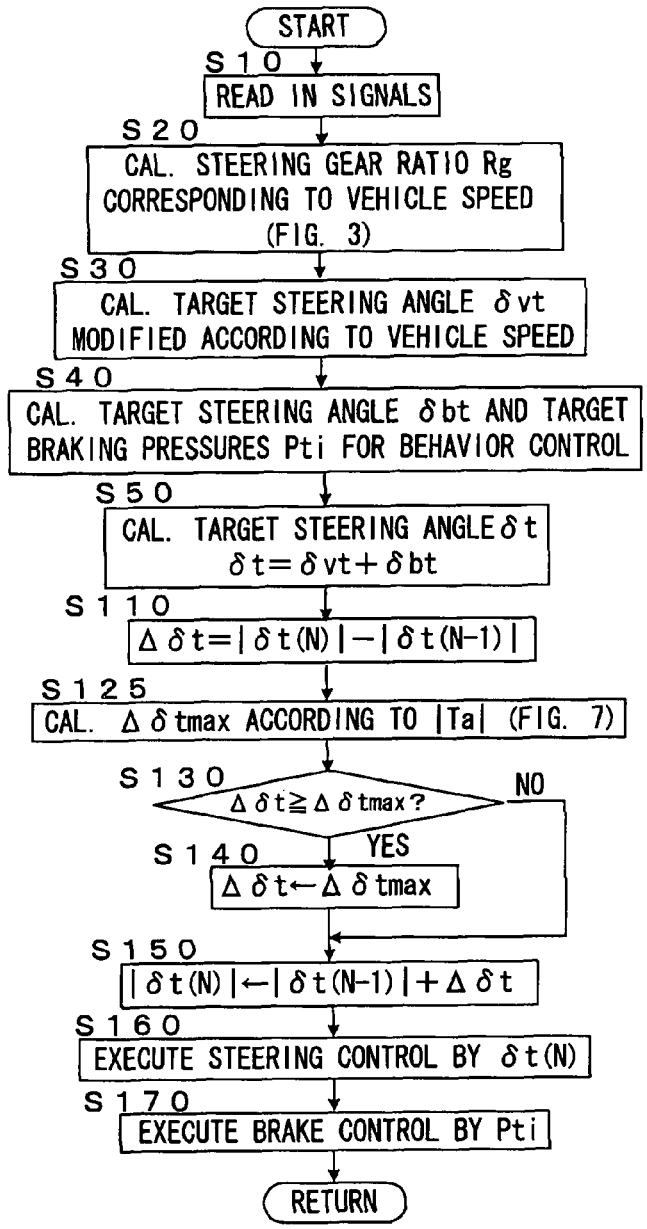
FIG. 6 is a flowchart showing still another manner of operation of the steering control device according to the present invention.

FIG. 6 is a flowchart showing still another manner of operation of the steering control device according to the present invention. Also in this embodiment the operations in steps 10-50 are the same as those in the flowcharts shown in FIGS. 2 and 4, and step 110 following step 50 is the same as in the flowchart of FIG. 4.

Figure 7:
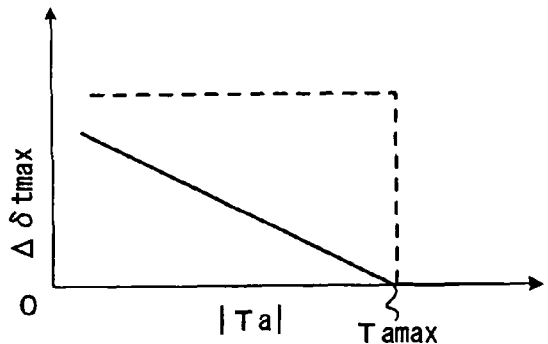
FIG. 7 is a map showing two examples of Δδtmax against |Ta|.

In this embodiment, in step 125 following step 110 the value of Δδtmax is calculated according to the value of |Ta| by referring to a map such as shown in FIG. 7 based upon the absolute value |Ta| of the reaction force Ta acting against the operation of the power steering device. The reason why the absolute value |Ta| is used with respect to Ta is also in that Ta is made a positive value in the left turn of the vehicle and a negative value in the right turn of the vehicle. Δδtmax is of the same meaning as that of Δδtmax in the flowchart of FIG. 4, except that, in this case, according to the solid line of the map of FIG. 7, Δδtmax decreases gradually as the reaction force |Ta| against the operation of the power steering device increases toward its maximum value Tamax, indeed after the steering angle of the steered wheels has reached its allowable maximum value, so as to be made 0 when |Ta| reaches Tamax.

In this case, steps 130-170 thereafter are the same as those in the flowchart of FIG. 4.

Also in this case, the map may be changed as shown by the broken line of FIG. 7. In such a case, the increase of Δδmax is totally made 0 when |Ta| has reached Tamax, and therefore, the change of the target steering amount δt in its approach to its allowable maximum value is the same as in the case of FIG. 2.

Figure 8:
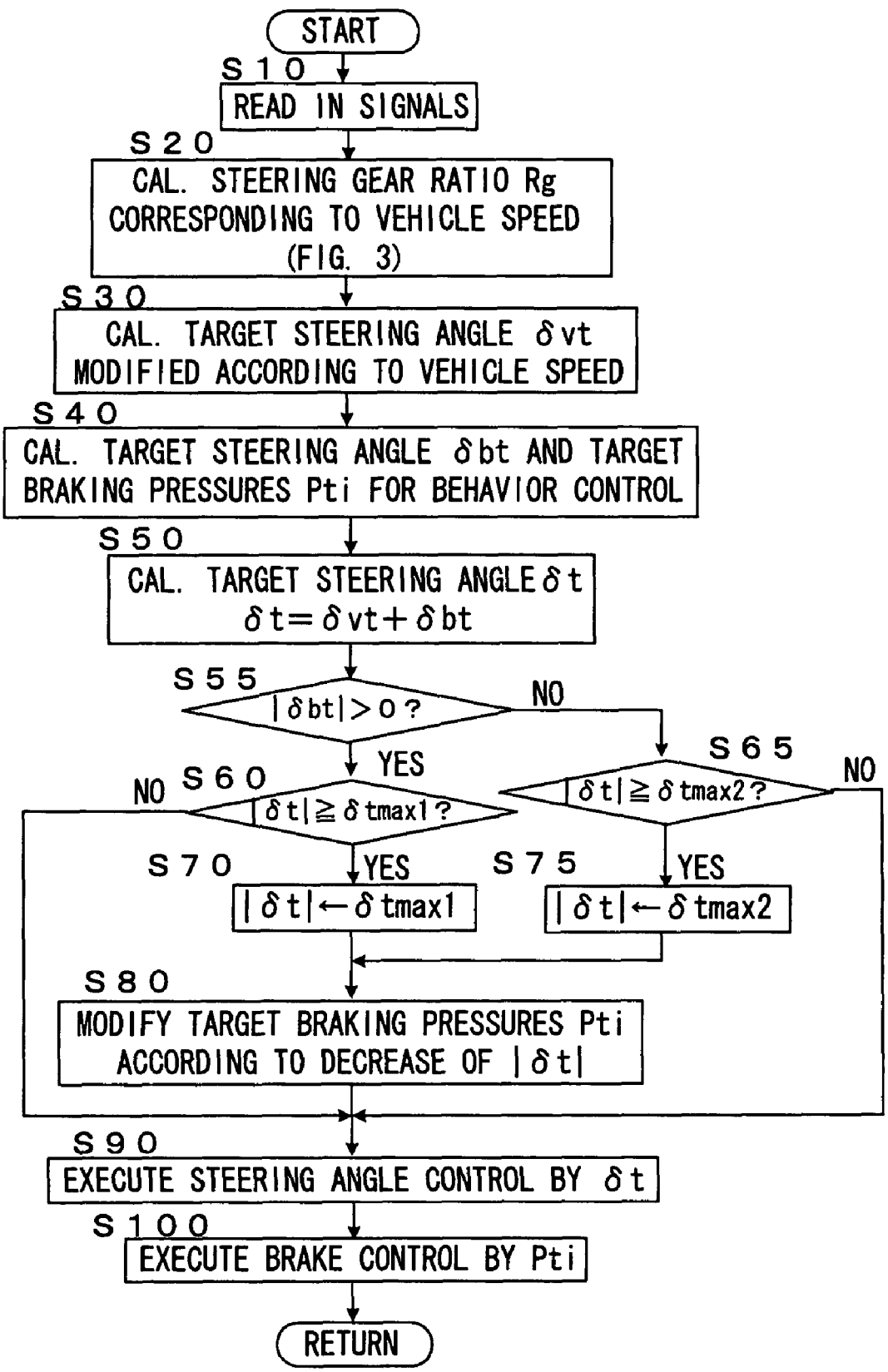
FIG. 8 is a flowchart showing a partial modification of the manner of operation of the steering control device shown in FIG. 2.

FIG. 8 is a flowchart showing an example of the modification about a portion of the manner of operation of the steering control device shown in FIG. 2. This is to change the value of the maximum target steering angle in the steering angle control according to whether the turning behavior control of the vehicle is executed or not. In the flowchart of FIG. 8 in which such a modification is applied to the flowchart of FIG. 2, in step 55 following step 50 it is judged if |δbt| is larger than 0 or not, i.e. if the turning behavior control is executed or not. When the answer is yes, the control proceeds to step 60, and |δt| is compared with a first limit value δtmax1, whereas when the turning behavior control is not executed, and therefore δbt| is 0 and the answer is no, the control proceeds to step 65, and |δt| is compared with a second limit value δtmax2. By such an arrangement, the present invention is more properly adapted to the particular performance of various turning behavior controls.

Since it is apparent that the same modification may be applied to the flowcharts of FIGS. 4 and 6, further descriptions with further illustration of flowchart will be omitted to avoid a redundancy of the specification and the drawing.

Although the present invention has been described with respect to several embodiments thereof and a partial modification thereof, it will be apparent for those skilled in the art that various modifications with respect to these embodiments are possible within the scope of the present invention.

The invention claimed is:

1. A steering control device of a vehicle equipped with a steering wheel, a pair of steered wheels and a power steering device for assisting steering of the steered wheels, the steering control device comprising:
    a calculating device for calculating a target steering angle for operating the power steering device, and
    a steering angle adjusting device interposed between the steering wheel and the power steering device for modifying a steering angle by the steering wheel transmitted to the power steering device,
    wherein:
        the target steering angle for operating the power steering device is restricted by the steering angle adjusting device not to exceed a determined value, wherein the target steering angle is calculated as a value not to exceed the determined value based upon a rotational angle of the steering wheel and turning behavior control of the vehicle.

2. A steering control device of a vehicle equipped with a steering wheel, a pair of steered wheels and a power steering device for assisting steering of the steered wheels, the steering control device comprising:
    a calculating device for calculating a target steering angle for operating the power steering device, and
    a steering angle adjusting device interposed between the steering wheel and the power steering device for modifying a steering anlge by the steering wheel transmitted to the power steering device,
    wherein:
        the target steering angle for operating the power steering device is restricted by the steering angle adjusting device not to exceed a determined value, wherein the target steering angle is made not to exceed the determined value by an excessive portion of the target steering angle being canceled when a calculated steering angle based upon a rotational angle of the steering wheel and turning behavior control exceeds the determined value.

3. A steering control device of a vehicle equipped with a steering wheel, a pair of steered wheels and a power steering device for assisting steering of the steered wheels, the steering control device comprising:
    a calculating device for calculating a target steering angle for operating the power steering device, and
    a steering angle adjusting device interposed between the steering wheel and the power steering device for modifying a steering angle by the steering wheel transmitted to the power steering device,
    wherein:
        the target steering angle for operating the power steering device is restricted by the steering angle adjusting device not to exceed a determined value, wherein the target steering angle is made not to exceed the determined value by a speed of increase of the target steering angle being gradually decreased when a calculated steering angle based upon a rotational angle of the steering wheel and turning behavior control approaches the determined value.

4. A steering control device of a vehicle equipped with a steering wheel, a pair of steered wheels and a power steering device for assisting steering of the steered wheels, the steering control device comprising:
    a calculating device for calculating a target steering angle for operating the power steering device, and
    a steering angle adjusting device interposed between the steering wheel and the power steering device for modifying a steering angle by the steering wheel transmitted to the power steering device, wherein:

the target steering angle for operating the power steering device is restricted by the steering angle adjusting device not to exceed a determined value, wherein the target steering angle is made not to exceed the determined value by a speed of increase of the target steering angle being made zero when a calculated steering angle based upon a rotational angle of the steering wheel and turning behavior control reaches the determined value.

5. A steering control device of a vehicle equipped with a steering wheel, a pair of steered wheels and a power steering device for assisting steering of the steered wheels, the steering control device comprising:

a calculating device for calculating a target steering angle for operating the power steering device, and a steering angle adjusting device interposed between the steering wheel and the power steering device for modifying a steering angle by the steering wheel transmitted to the power steering device, wherein:

the target steering angle for operating the power steering device is restricted by the steering angle adjusting device such that a reaction force against operation of the power steering device does not exceed a determined value, wherein the reaction force against operation of the power steering device is made not to exceed the determined value by an increase of speed of a calculated steering angle based upon a rotational angle of the steering wheel and turning behavior control being gradually decreased when the reaction force approaches the determined value.

6. A steering control device of a vehicle equipped with a steering wheel, a pair of steered wheels and a power steering device for assisting steering of the steered wheels, the steering control device comprising:

a calculating device for calculating a target steering angle for operating the power steering device, and a steering angle adjusting device interposed between the steering wheel and the power steering device for modifying a steering angle by the steering wheel transmitted to the power steering device, wherein:

the target steering angle for operating the power steering device is restricted by the steering angle adjusting device such that a reaction force against operation of the power steering device does not exceed a determined value, wherein the reaction force against operation of the power steering device is made not to exceed the determined value by speed of increase of a calculated steering angle based upon a rotational angle of the steering wheel and turning behavior control being made zero when the reaction force reaches the determined value.

7. A steering control device of a vehicle equipped with a steering wheel, a pair of steered wheels and a power steering device for assisting steering of the steered wheels, the steering control device comprising:

a calculating device for calculating a target steering angle for operating the power steering device, and a steering angle adjusting device interposed between the steering wheel and the power steering device for modifying a steering angle by the steering wheel transmitted to the power steering device, wherein:

the target steering angle for operating the power steering device is restricted by the steering angle adjusting device such that a reaction force against operation of the power steering device does not exceed a determined value, wherein the determined value is changed according to whether turning behavior control of the vehicle is executed or not.

8. A steering control device of a vehicle equipped with a steering wheel, a pair of steered wheels and a power steering device for assisting steering of the steered wheels, the steering control device comprising:

a calculating device for calculating a target steering angle for operating the power steering device, and a steering angle adjusting device interposed between the steering wheel and the power steering device for modifying a steering angle by the steering wheel transmitted to the power steering device, wherein:

the target steering angle for operating the power steering device is restricted by the steering angle adjusting device not to exceed a determined value, wherein the determined value is changed according to whether turning behavior control of the vehicle is executed or not.

* * * * *